United States Patent
Jacob et al.

(10) Patent No.: US 7,837,868 B2
(45) Date of Patent: *Nov. 23, 2010

(54) FLOW CONTROL STRUCTURE AND RELATED MEDIA FILTRATION SYSTEM

(75) Inventors: David W. Jacob, Brightwood, OR (US); Christopher S. Hersey, Portland, ME (US); Casey T. Kenniston, Cape Elizabeth, ME (US); Michael P. Stone, Falmouth, ME (US)

(73) Assignee: Contech Stormwater Solutions, Inc., West Chester, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/617,149

(22) Filed: Nov. 12, 2009

(65) Prior Publication Data

US 2010/0051525 A1    Mar. 4, 2010

Related U.S. Application Data

(63) Continuation of application No. 12/142,401, filed on Jun. 19, 2008, now Pat. No. 7,638,066.

(51) Int. Cl.
*B01D 35/027* (2006.01)

(52) U.S. Cl. .......... 210/155; 210/162; 210/170.03; 210/299; 210/459; 285/61; 285/197

(58) Field of Classification Search .......... 210/747, 210/767, 804, 123, 155, 162, 163, 164, 170.03, 210/299, 459, 460; 248/74.4; 285/61, 197
See application file for complete search history.

(56) References Cited

U.S. PATENT DOCUMENTS

| | | | | |
|---|---|---|---|---|
| 272,881 A | | 2/1883 | Houghton | |
| 770,019 A | * | 9/1904 | Neireiter | 210/459 |
| 3,443,581 A | * | 5/1969 | Lyell | 285/197 |
| 3,856,208 A | * | 12/1974 | Naftaly | 285/61 |
| 4,316,622 A | * | 2/1982 | Nelson | 210/459 |
| 5,433,845 A | | 7/1995 | Greene et al. | |
| 5,553,898 A | * | 9/1996 | Rogers, Jr. | 285/197 |
| 5,590,913 A | * | 1/1997 | Morris et al. | 285/197 |
| 5,707,527 A | | 1/1998 | Knutson et al. | |
| 6,027,639 A | | 2/2000 | Lenhart, Jr. et al. | |

(Continued)

FOREIGN PATENT DOCUMENTS

WO    WO 97/41068    11/1997

(Continued)

*Primary Examiner*—Christopher Upton
(74) *Attorney, Agent, or Firm*—Thompson Hine LLP

(57) ABSTRACT

A stormwater filtration system includes a stormwater containment structure including a bottom surface, an inlet that receives stormwater and an outlet through which filtered stormwater exits the stormwater containment structure. A flow structure is at the bottom surface. The flow structure includes a conveyance conduit running along the bottom surface of the stormwater containment structure and in fluid communication with the outlet of the stormwater containment structure. The conveyance conduit includes a port extending through a sidewall of the conveyance conduit. A saddle includes an upper component and a lower component connected to the upper component such that the upper and lower components straddle the conveyance conduit at the port. The upper component includes an opening in communication with the port and the lower component supports the conveyance conduit above the bottom surface.

10 Claims, 12 Drawing Sheets

U.S. PATENT DOCUMENTS

| | | | |
|---|---|---|---|
| 6,077,423 A | 6/2000 | Roy et al. | |
| 6,077,448 A | 6/2000 | Tran-Quoc-Nam et al. | |
| 6,171,507 B1 | 1/2001 | Roy et al. | |
| 6,231,758 B1 | 5/2001 | Morris et al. | |
| 6,241,882 B1 * | 6/2001 | Allard | 210/162 |
| 6,251,269 B1 | 6/2001 | Johnson et al. | |
| 6,350,374 B1 | 2/2002 | Stever et al. | |
| 6,406,620 B1 * | 6/2002 | Rogers | 210/155 |
| 6,524,473 B2 | 2/2003 | Williamson | |
| 6,533,941 B2 | 3/2003 | Butler | |
| 6,638,424 B2 | 10/2003 | Stever et al. | |
| 6,649,048 B2 | 11/2003 | de Ridder et al. | |
| 6,793,811 B1 | 9/2004 | Fleischmann | |
| 6,998,038 B2 | 2/2006 | Howard | |
| 7,001,527 B2 | 2/2006 | Stever et al. | |
| 7,108,783 B2 * | 9/2006 | Glazik | 210/163 |
| 2003/0094407 A1 | 5/2003 | de Ridder et al. | |
| 2006/0016767 A1 | 1/2006 | Olson et al. | |
| 2006/0207922 A1 | 9/2006 | Dussich | |
| 2007/0289908 A1 * | 12/2007 | Williamson et al. | 210/170.03 |
| 2008/0277326 A1 * | 11/2008 | Hersey et al. | 210/170.03 |

FOREIGN PATENT DOCUMENTS

WO    WO 2005/012183    2/2005

* cited by examiner

FLOW CONTROL STRUCTURE AND RELATED MEDIA FILTRATION SYSTEM

CROSS-REFERENCES

This application is a continuation of Ser. No. 12/142,401, filed Jun. 19, 2008, the entirety of which is hereby incorporated by reference.

TECHNICAL FIELD

The present application relates generally to systems for treating stormwater and more particularly to a flow control structure and related media filtration system.

BACKGROUND

Stormwater is pure rainwater plus any particulate debris and dissolved materials that the rainwater may entrain as it traverses a surface. In urban areas, rain that falls on the roofs of buildings, collects on paved areas like driveways, roads, runways and sidewalks is typically diverted through a system of pipes, catch basins, etc. that is separate from the sewerage system. Unlike sewerage, stormwater historically has not been treated, but flowed directly from streets and gutters into natural bodies of water, e.g., rivers, lakes and the ocean.

Stormwater can therefore be a form of diffuse or non-point source pollution. It can entrain pollutants, such as garbage, sediment, organic matter, heavy metals, and organic toxins, and transport them into receiving natural bodies of water. As a consequence, natural bodies of water that receive stormwater may also receive the pollutants.

The amount of stormwater pollution entering into such receiving bodies of water is related to the degree of urbanization in the surrounding area and the nature of the surrounding activities. Urbanization results in the covering of land with structures of various permeabilities, such as roadways, parking lots, and rooftops, which both generate large volumes of stormwater and accumulate pollutants. Since some of these surfaces do not allow rainfall to infiltrate, they allow the accumulated pollutants to be carried into stormwater drainage systems.

In an effort to address the environmental problems posed by polluted stormwater, systems which may include traps and filters for stormwater have been developed. For example, a filter apparatus described in U.S. Pat. No. 6,027,639 features a siphon-inducing mechanism. The filter apparatus of the '639 patent utilizes a sealed upper housing that includes a check valve for air evacuation within the housing. An induced siphon effect pulls stormwater through the filter until air is pulled through an air inlet along the lower perimeter of the housing, disrupting the siphon.

SUMMARY

In an aspect, a stormwater filtration system includes a stormwater containment structure including a bottom surface, an inlet that receives stormwater and an outlet through which filtered stormwater exits the stormwater containment structure. A flow structure is at the bottom surface. The flow structure includes a conveyance conduit running along the bottom surface of the stormwater containment structure and in fluid communication with the outlet of the stormwater containment structure. The conveyance conduit includes a port extending through a sidewall of the conveyance conduit. A saddle includes an upper component and a lower component connected to the upper component such that the upper and lower components straddle the conveyance conduit at the port. The upper component includes an opening in communication with the port and the lower component supports the conveyance conduit above the bottom surface.

In another aspect, a method of stormwater filtration includes providing a stormwater containment structure including a bottom surface. The stormwater containment structure includes an inlet that receives stormwater and an outlet through which filtered stormwater exits the stormwater containment structure. A flow structure is assembled by positioning a conveyance conduit along the bottom surface of the stormwater containment structure in fluid communication with the outlet of the stormwater containment structure. The conveyance conduit includes a port extending through a sidewall of the outlet conduit. The conveyance conduit is supported above the bottom surface using a saddle including an upper component and a lower component connected to the upper component such that the upper and lower components straddle the conveyance conduit at the port. The upper component includes an opening in communication with the port and the lower component supports the conveyance conduit above the bottom surface.

In another aspect, a stormwater filtration system includes a stormwater containment structure including a bottom surface, an inlet that receives stormwater and an outlet through which filtered stormwater exits the stormwater containment structure. A flow structure is at the bottom surface. The flow structure includes a conveyance conduit running along the bottom surface for delivering stormwater to the outlet of the stormwater containment structure. The conveyance conduit includes a port extending through a sidewall of the outlet conduit. A saddle includes an opening in communication with the port. The saddle supports the conveyance conduit above the bottom surface. An outlet assembly regulates flow of water to the outlet of the containment structure. The outlet assembly includes a valve inlet in communication with the conveyance conduit and a valve outlet in communication with the outlet of the containment structure. A valve member is located between the valve inlet and valve outlet that opens and closes a passageway from the valve inlet to the valve outlet for controlling flow of water through the valve outlet as water level rises in the containment structure.

The details of one or more embodiments are set forth in the accompanying drawings and the description below. Other features, objects, and advantages will be apparent from the description and drawings, and from the claims.

DETAILED DESCRIPTION

Figure 1:
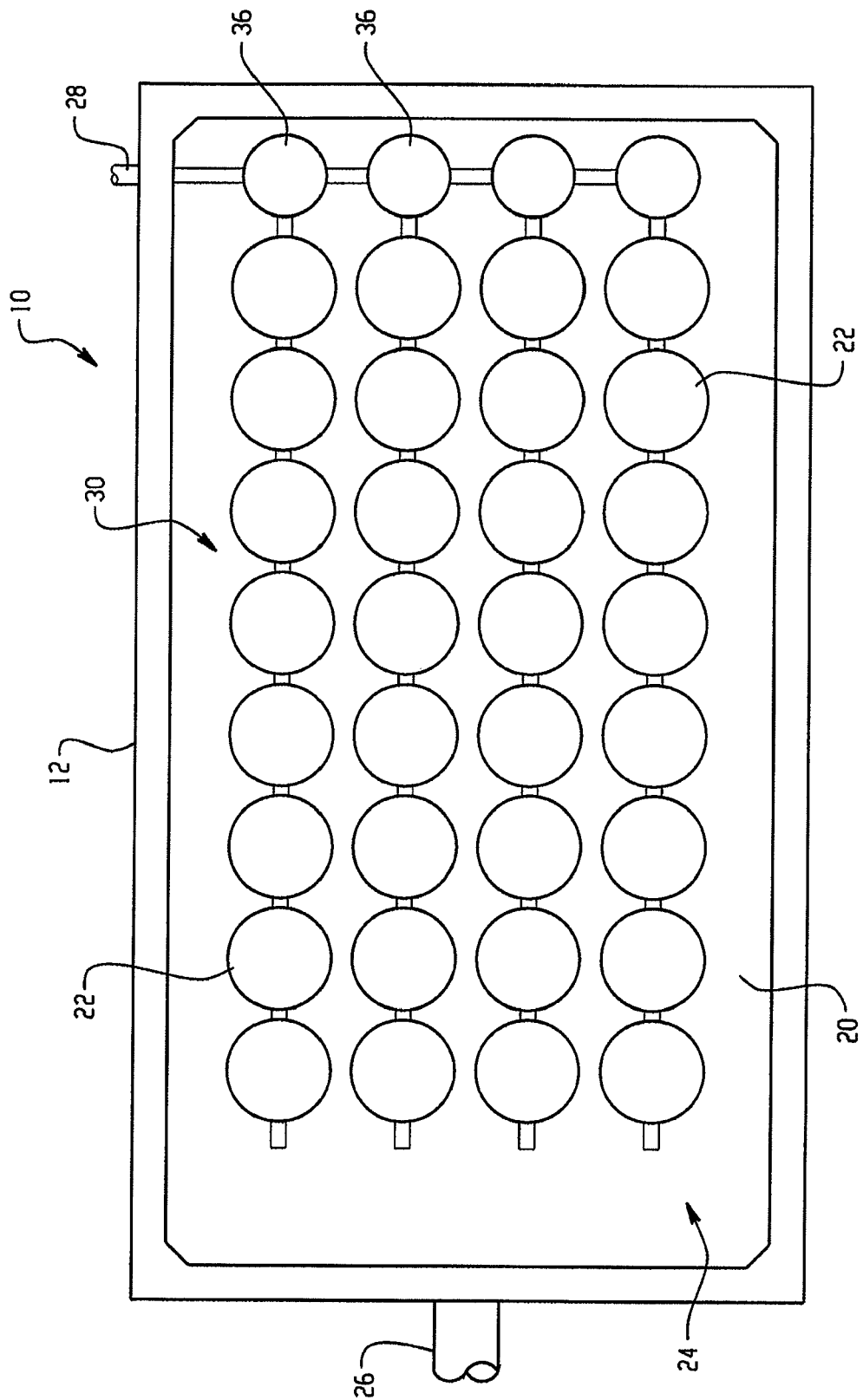
FIG. 1 is a diagrammatic, top view of an embodiment of a stormwater treatment system.

Referring to FIG. 1, a stormwater treatment system 10 includes a vault 12 having an access opening at a top of the vault through which access can be gained to an interior 24 of the vault (e.g., by removing a vault cover) and a floor 20 that, in the illustrated embodiment, is formed of concrete. The stormwater treatment system 10 further includes an inlet 26 through which stormwater enters the vault 12 and an outlet 28 through which stormwater exits the vault. A manifold of filter assemblies 22 are located in the interior 24 of the vault 12 for use in filtering stormwater entering through the inlet. The filter assemblies 22 are connected to and in communication with a flow structure 30 that supports the filter assemblies 22 above the floor 20 and directs filtered stormwater toward the outlet 28.

Figure 2:
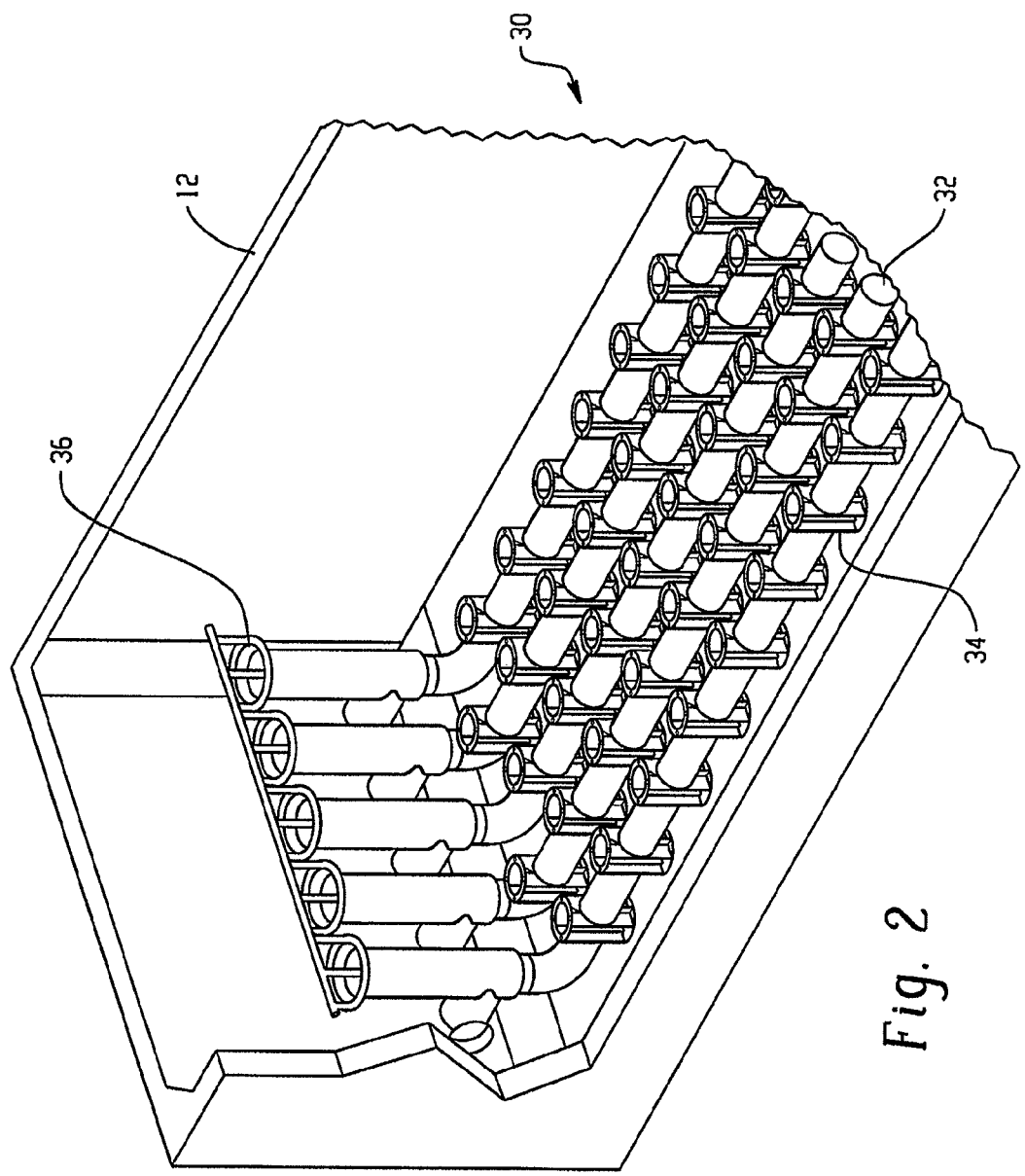
FIG. 2 is a perspective view of the stormwater treatment system of FIG. 1 with filter assemblies removed.

Referring to FIG. 2 the stormwater treatment system 10 is shown with the filter assemblies 22 removed. The flow structure 30 includes a plurality of conveyance conduits 32 that extend from one end of the vault 12 at which the inlet 26 is located to an opposite end at which the outlet 28 is located. A plurality of saddles 34 are connected along the lengths of the conveyance conduits 32. The saddles 34 support the conveyance conduits 32 at a location above the floor 20 and provide a connection point between the filter assemblies 22 and the conveyance conduits. Valve assemblies 36 are connected at ends of the conveyance conduits 32. The valve assemblies 36 are used to control flow of filtered water from the vault 12.

Figure 3:
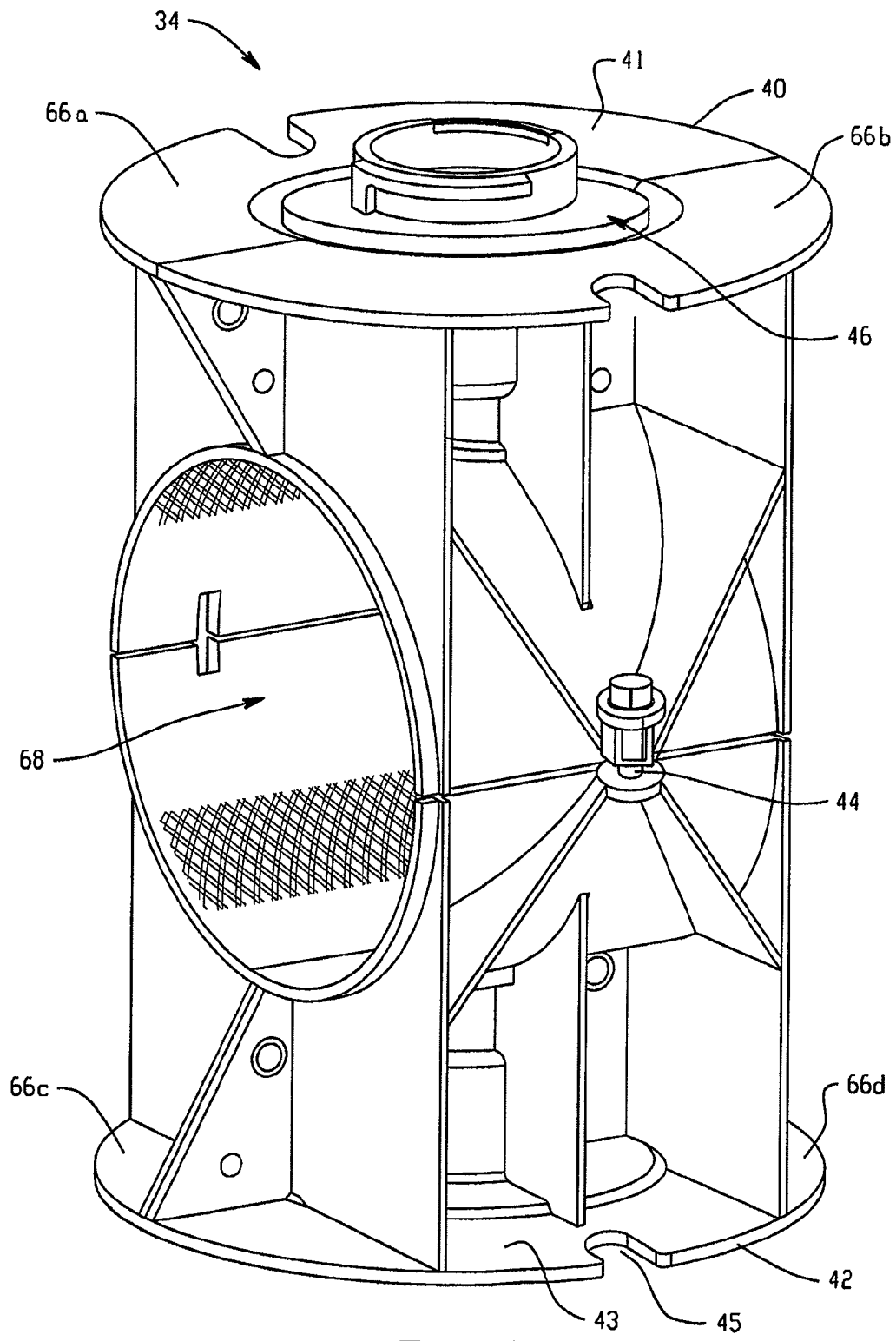
FIGS. 3 and 4 illustrate an embodiment of a saddle for use in connecting filter assemblies in the stormwater treatment system of claim 1.
Figure 4:
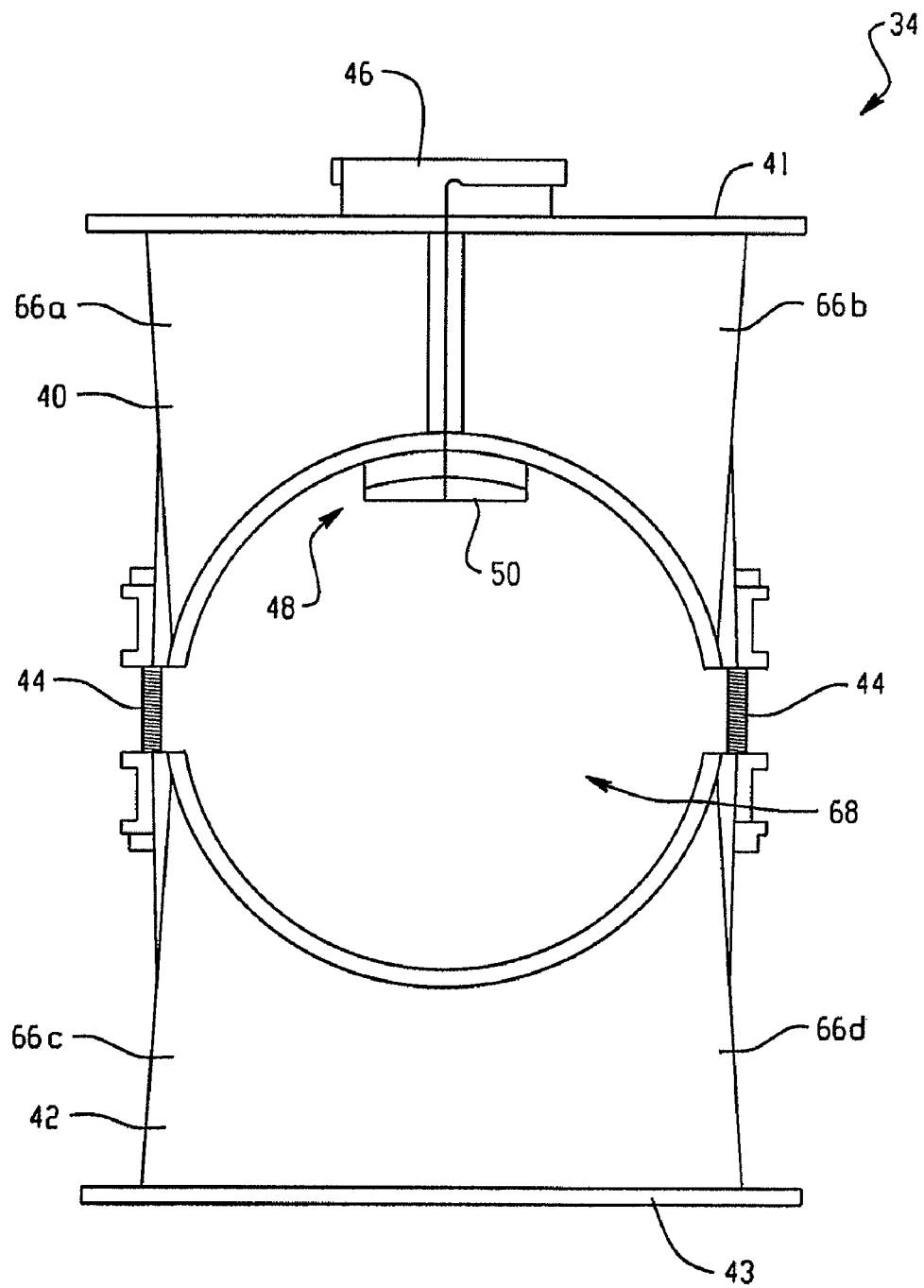

Referring to FIGS. 3 and 4, saddle 34 includes an upper component 40 and a lower component 42 that are connected together by adjustable connectors 44. The upper and lower components 40 and 42 straddle the conveyance conduit 32 at a port through the sidewall of the conveyance conduit. The adjustable connectors 44 allow for some vertical adjustment of the upper and lower components 40 and 42 relative to each other for accommodating the conveyance conduit 32 and forming a seal between the saddle 34 and the conveyance conduit at the port.

The upper component 40 includes a seating surface 41 for supporting the filter assembly 22. The lower component 42 provides support structure including a base surface 43 for supporting and stabilizing the saddle 34, conveyance conduit 32 and filter assembly 22 at a location above the floor 20. The lower component 42 also includes bolt openings 45 that can be used to bolt the saddle 34 to the floor 20.

A filter unit connector 46 is located at a top of the upper component 40. The filter unit connector 46 includes structure for releasably connecting the filter assembly 22 to the saddle 34, e.g., by turning or screwing the filter assembly onto the filter unit connector 46. The filter unit connector 46 is in communication with an opening 48 extending vertically through the upper component 40.

A stub connector 50 is located at a lower portion of the upper component 40. The stub connector 50 has an opening extending therethrough that is in communication with the opening 48 extending through the upper component 40. The stub connector 50 is used to guide, connect and seal the saddle 34 to the conveyance conduit 32 at the port.

Figure 5:
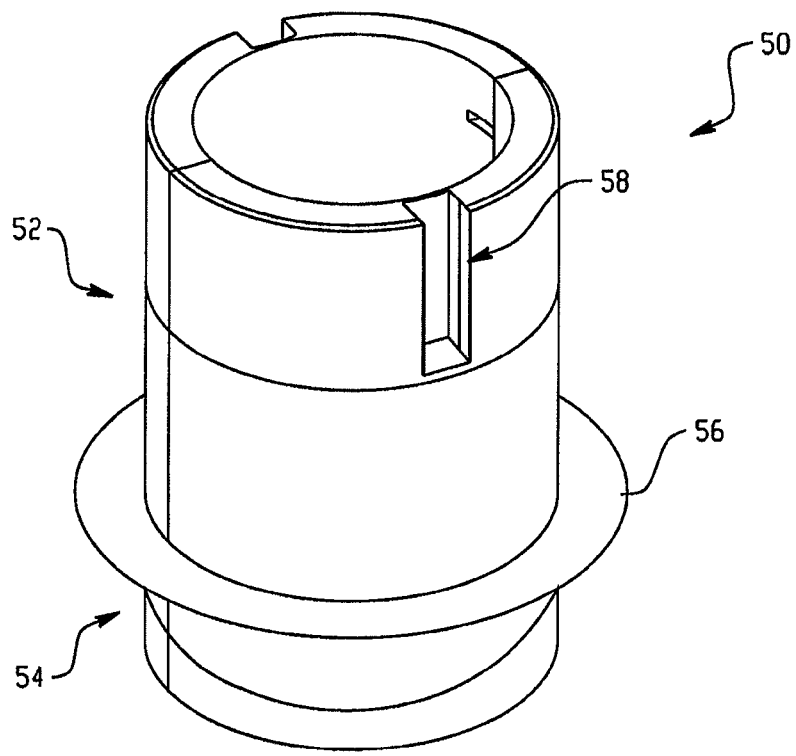
FIG. 5 is a perspective view of an embodiment of a stub connector for use with the saddle of FIGS. 3 and 4.

Referring to FIG. 5, the stub connector 50 includes a first portion 52 and a second portion 54 that are separated by a sealing member 56 (e.g., an O-ring). First portion 52 includes grooves 58 for alignment with the saddle 34. Second portion 54 is sized to be received within the port of the conveyance conduit 32. The saddle 34 is sealed to the conveyance conduit 32 by tightening the sealing member 56 against the conveyance conduit using the adjustable connectors 44. The outer diameter of the sealing member 56 is larger than the diameter of the part of the conveyance conduit 32 to form the seal.

Figure 6:
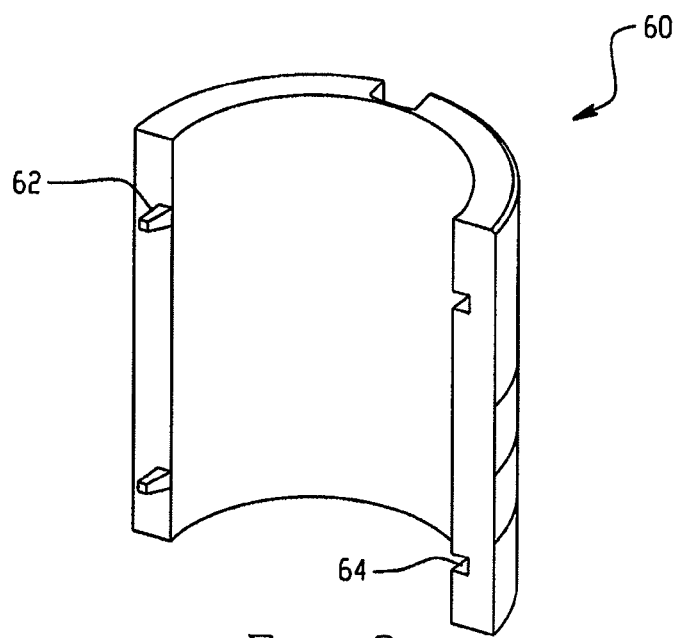
FIG. 6 is a part of the stub connector of FIG. 5.

Referring to FIG. 6, the stub connector 50 is formed by two substantially identical half parts 60 that are glued together to create a seal. Alignment tabs 62 and slots 64 are provided for alignment of the half parts 60 during assembly. Once glued together and the sealing member 56 applied thereto, the stub connector 50 can then be glued into the opening 48 of the upper component 40 as shown by FIG. 4.

Referring back to FIGS. 3 and 4, the upper component 40 is formed by two saddle quarter pieces 66a and 66b connected together in a side-by-side arrangement (e.g., by glue and/or fasteners). Likewise, the lower component 42 is formed by two saddle quarter pieces 66c and 66d connected together in a side-by-side arrangement (e.g., by glue and/or fasteners). Once assembled, the saddle quarter pieces 66a-66d provide a conduit opening 68 through which the conveyance conduit 32 can extend. While the conduit opening 68 is shown as circular in section, other shapes are possible to match the contour of the conveyance conduit 32, such as rectangular.

FIGS. 7-10 illustrate one of the saddle quarter pieces 66. All of the saddle quarter pieces 66 are substantially identical in shape and include the same features. As one example, all of the saddle quarter pieces 66 may be molded of a plastic material and from the same mold or substantially identical molds. Other configurations are possible, however, where the saddle quarter pieces are not identical and include different features.

Figure 7:
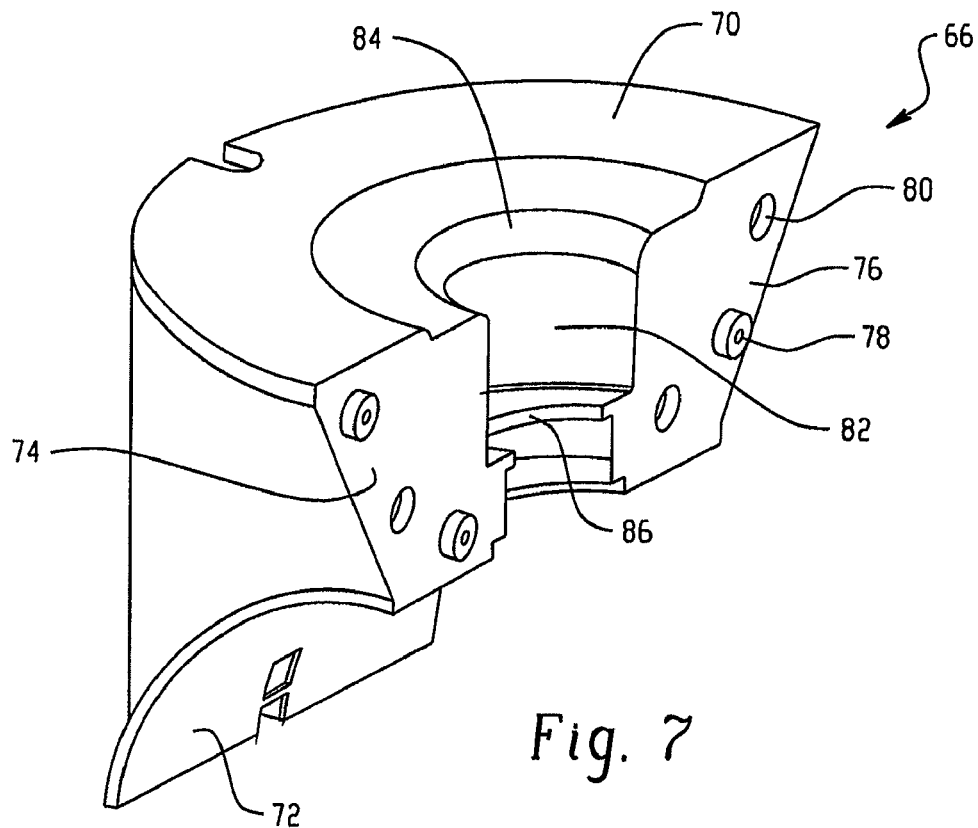
FIGS. 7-10 are views of an embodiment of a saddle quarter piece that forms the saddle of FIGS. 3 and 4.
Figure 8:
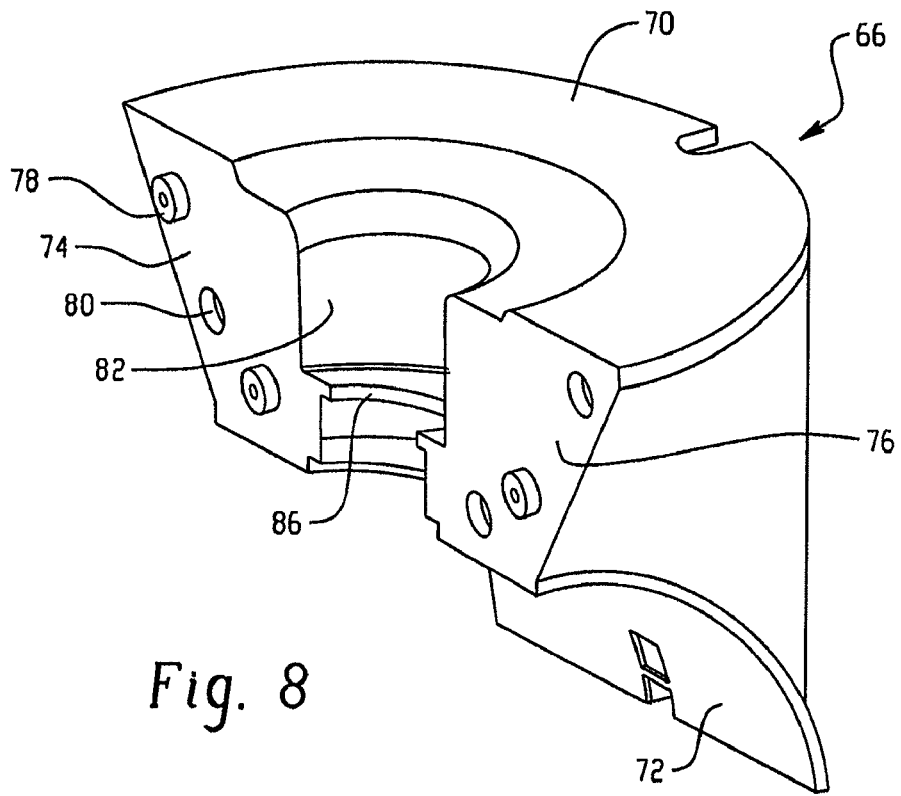

Referring first to FIGS. 7 and 8, the general profile of the saddle quarter piece 66 is a quarter of a cylinder and includes a relatively flat top 70 and an arcuate surface 72 that is a quarter of the circular conduit opening 68. A vertically extending recessed region 82 is used to form the opening 48. A first mount area 84 may be used to mount the filter unit connector 46 and a second mount area 86 may be used to mount a flow restriction orifice (not shown).

Interface regions 74 and 76 are provided that mate with corresponding interface regions of the adjacent saddle quarter piece 66. The interface regions 74 and 76 include buttons 78 that are received in holes 80 of the adjacent saddle quarter piece 66. Screws or other fasteners can be driven through the buttons 78 to hold the side-by-side saddle quarter pieces 66 together. Glue placed on the buttons 78 may also be used.

Figure 9:
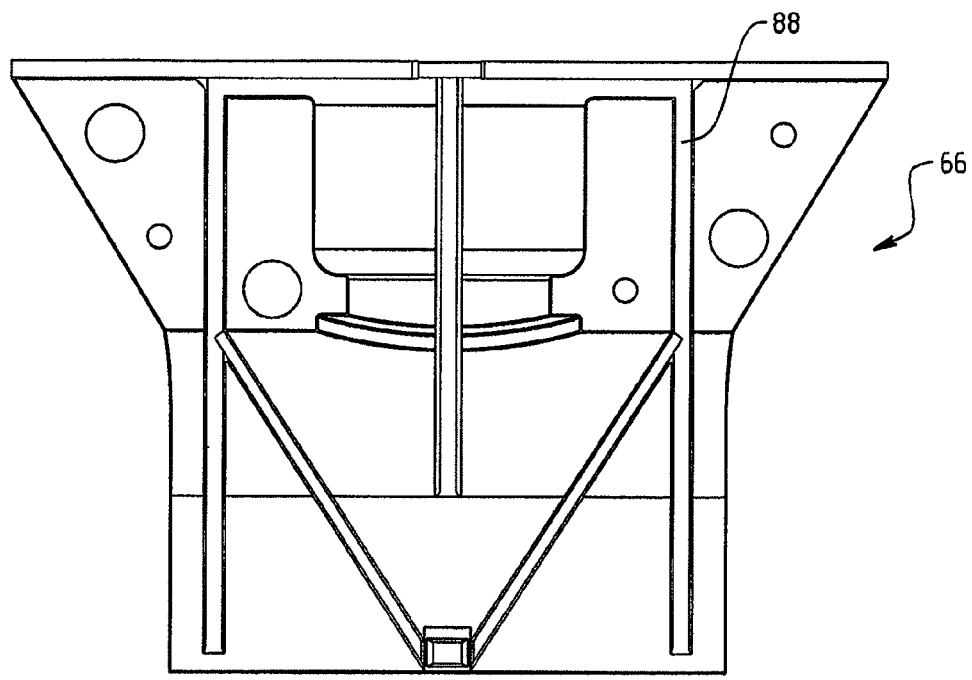
Figure 10:
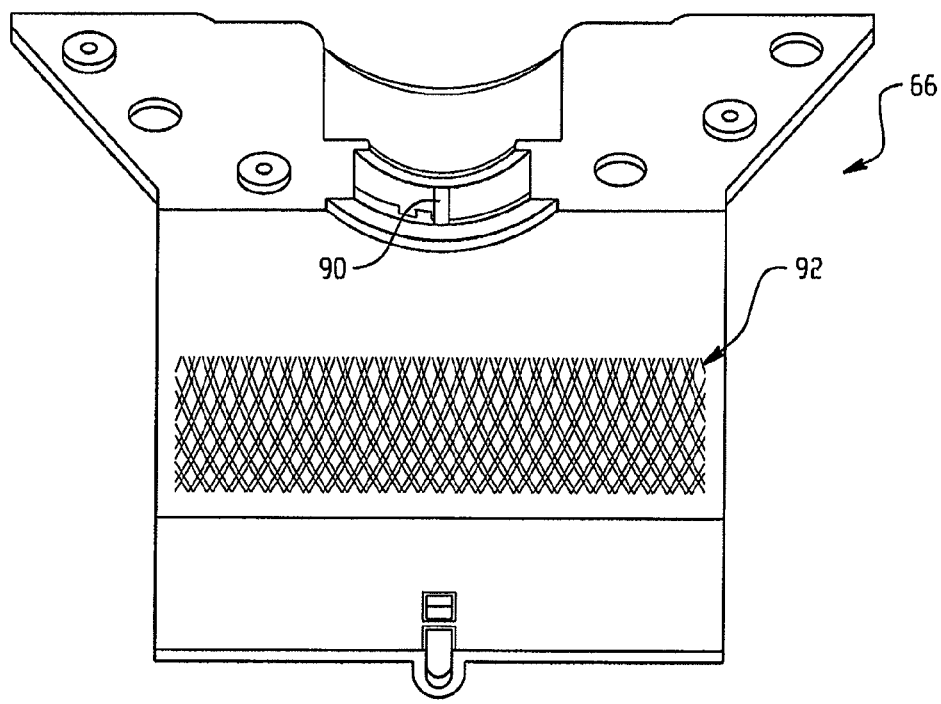

Referring to FIG. 9, a pattern of ribs 88 are provided for increased strength of the assembled saddle 34. Referring to FIG. 10, projection 90 mates with groove 58 of the stub connector 50 (FIG. 5) for alignment and securement of the stub connector in the upper component 40. Knurling 92 is provided on the arcuate surface 72 to increase friction between the saddle 34 and the conveyance conduit 32 for inhibiting relative movement therebetween.

Figure 11:
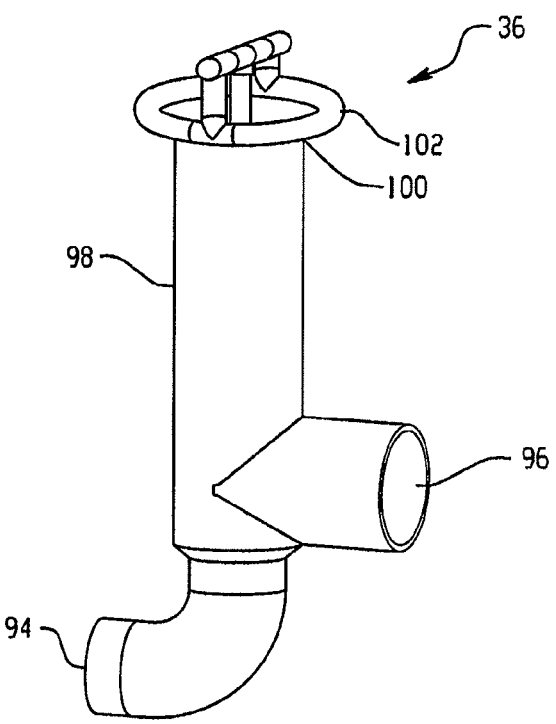
FIGS. 11-15 are views of an embodiment of a valve assembly for use in the stormwater treatment system of FIG. 1.

Referring to FIG. 11, the valve assembly 36 is connected to the conveyance conduit 32 at a valve inlet 94. The valve assembly 36 is also connected to the outlet 28 of the vault 28 at a valve outlet 96. A main conduit 98 extends vertically above the valve outlet 96 to an overflow 100. A float 102 is located above the overflow 100.

Figures 12, 13:
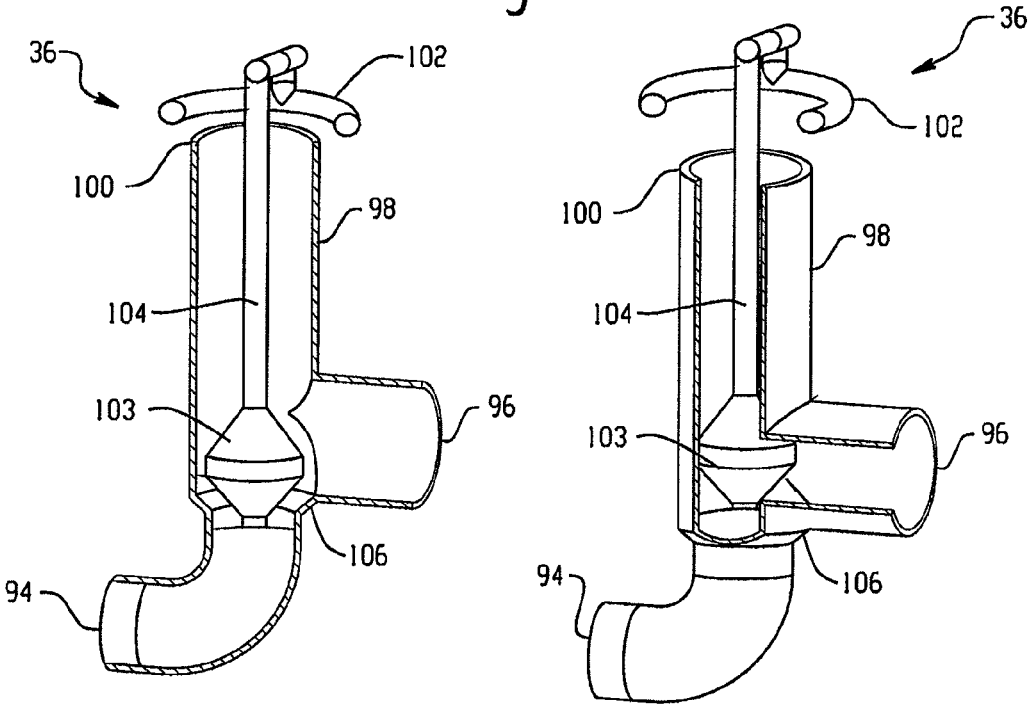
Figure 14:
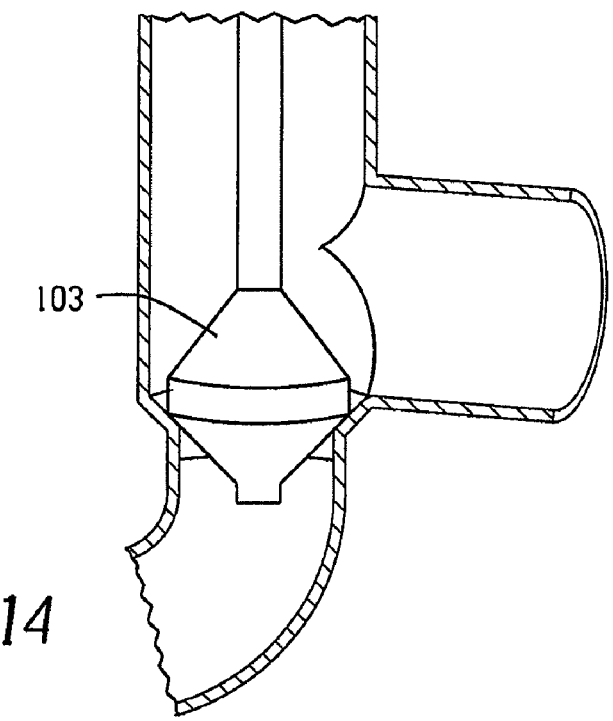
Figure 15:
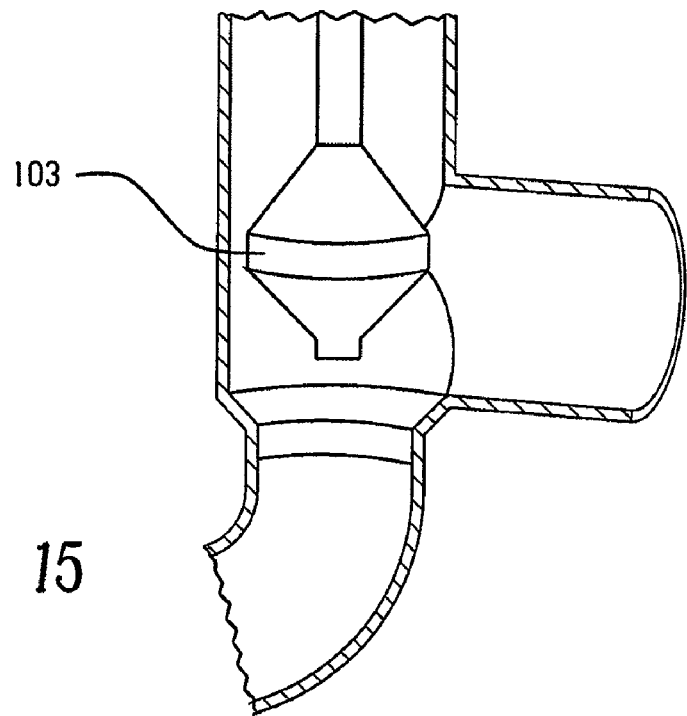

FIGS. 12 and 13 illustrate a section view of the valve assembly 36. A valve 103 is connected to the float 102 via a hollow connector shaft 104. The connector shaft 104 is hollow and open to the atmosphere to keep pressure inside the valve 102 and pressure outside the valve equal which allows the valve to operate properly. The vented and connected shaft 104 reduces the force needed to keep the valve 103 closed by using the weight of the water inside the shaft 104 to counter act the pressure on the valve 103 from the valve inlet 94. The float 102 lifts from a seat 106 as water reaches the top of the filter assemblies. The valve 103 then regulates flow with the water level in the vault 12. As the water level in the vault rises, the valve 103 is lifted higher with the increasing water level, which, in turn, allows more water out of the vault thereby controlling the water level in the vault. See FIGS. 14 and 15 showing the valve 103 in closed and open positions, respectively. In the event that the flow through the valve assembly 36 is not sufficient and water continues to build in the vault 12, the water can overflow the main conduit 98 over the overflow 100 toward the outlet 96 bypassing the filter assemblies. A floatable baffle (not shown) can be provided on the float 102 or to the top of the main conduit 98 to prevent unwanted floatables from leaving the system.

Figure 16:
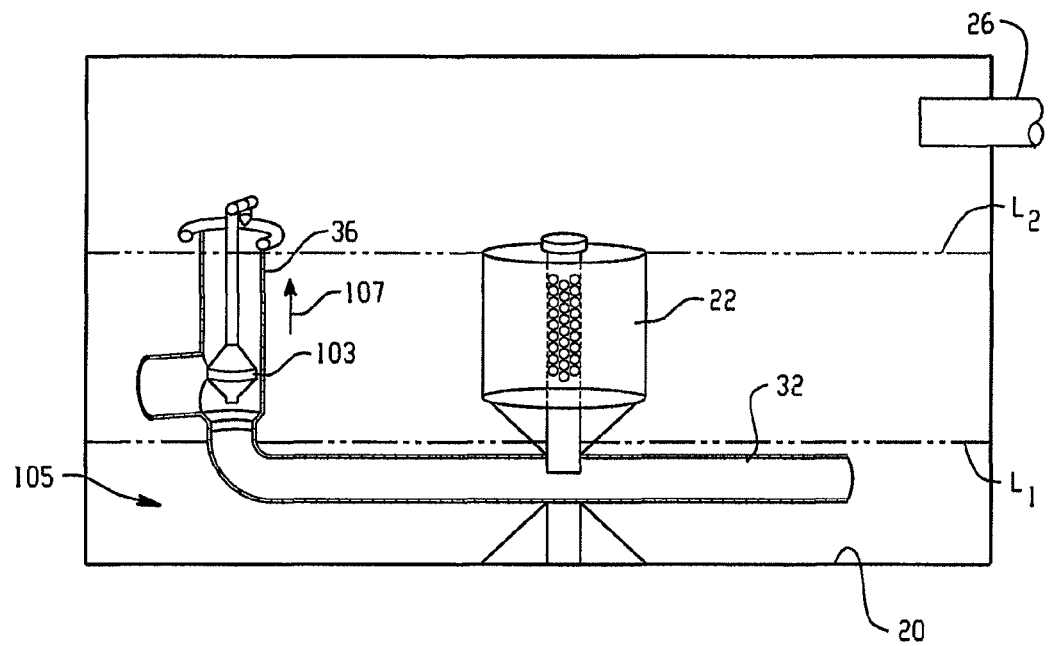
FIG. 16 is a diagrammatic, section view of an embodiment of a stormwater treatment system during operation.

Referring to FIG. 16, valve assembly 36 is shown in a closed state in response to a water level $L_1$ being below a point of actuation for the valve assembly. A residual amount of fluid remains in the treatment region so as to keep the sediment hydrated to reduce caking. In some embodiments, a drain port (not shown) is provided to permit draining of the treatment region. As can be seen, a sedimentation zone 105 is provided below the filter assembly 22 by lifting the filter assembly off the floor 20. Providing a sedimentation zone 105 allows suspended sediment to settle onto the floor 20 of the chamber thereby limiting the potential for clogging of the filter assembly 22.

As water enters through inlet 26, the water level rises. As the water level rises from the sedimentation zone 105 to $L_2$, water is filtered through the filter assembly 22 and the valve 103 moves upward in the direction of arrow 107 actuating the valve assembly 36. Upon actuation, valve 103 opens and water flows through the filter assembly 22 into the conveyance conduit 32 and through the valve assembly 36, ultimately exiting the system through the outlet 28.

The flow control structure 30 may be formed by any suitable method. As one example, the conduits and valve assembly may be molded or extruded from a suitable plastic material such as ABS, PVC, etc.

Figure 17:
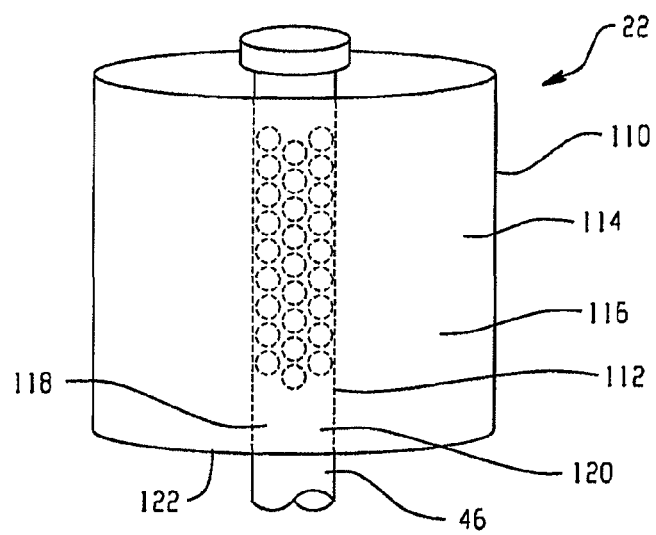
FIG. 17 is a diagrammatic view of an embodiment of a filter assembly for use with the stormwater treatment system of FIG. 1.

Any suitable filter assembly may be used with the flow control structure 30. FIG. 17 shows an exemplary cartridge 22 having a cartridge outer wall 110 and a cartridge inner wall 112 having disposed therebetween, media region 114 with filter media 116. The inner wall 112 defines a passageway 118 that is in communication with a cartridge outlet 120 that is connected to the filter unit connector 46.

On occasion, cartridges 22 may be removed from the system for servicing or replacement. In some embodiments, a tool (not shown) may be used to turn the cartridge 22 in removing or decoupling the cartridge from the filter unit connector 46.

Cartridge 22 may be formed from a variety of materials. For example, the outer and inner cartridge walls 110 and 112 may be formed of a permeable material such as a porous material or a screen, polymers, plastic, metal (e.g., aluminum, stainless steel) etc. Outer and inner walls 110 and 112 may be specially treated to minimize accumulation of material onto their surfaces. For example, outer wall 110 may be coated with a non-sticking material such as PTFE or Teflon, to prevent the sticking of sediments to the surface of outer wall. In other embodiments, a pre-filter sleeve, not shown, may be placed against outer wall 110 to provide additional treatment capacity to cartridge 22. Pre-filter sleeves may be made from foam (e.g., elastomeric foam) woven fabric, (e.g., fiberglass or a polymer). In use, pre-filters would be exchanged at in between cartridge exchanges to effectively prolong the life of the cartridge 22. This is especially useful in applications where fine suspended solids are found which do not readily sediment, yet are large enough to plug the interstitial spaces within the bed formed by the media. In this situation, the pre-filter would serve to trap such fine solids from the liquid prior to the liquid contacting the media in the bed. Pre-filters may also provide a treatment to the fluid different than the treatment provided by the media, thus creating a combination of treatments. Moreover, in some embodiments, media may be mixed media, wherein different media components are layered and/or mixed together within the media region of cartridge 22. Cartridges may further comprise ends 122 which serve to space-apart outer and inner cartridge walls 110 and 112, and to close off the ends of the media space. Ends 122 may be made from wood, metal, plastic or a polymer, among other material compatible with the liquid to be treated. Ends 122 may further include one or more recesses for receiving the outer and/or inner cartridge wall edges, to retain and protect the edge of such walls from catching or snagging during movement or exchange of cartridges 22.

Cartridge 22 may further include outer shroud so that, in some embodiments, further protects cartridge outer wall 110 from plugging by providing a longer fluid path for which fluid containing fine solids must travel. This longer path serves to reduce the turbulence of the fluid as it enters cartridge 22. The outer shroud may further provide for other benefits as described in U.S. Pat. No. 6,027,639, by Lenhart, et al., and U.S. Pat. No. 5,707,527, by Knutson, et al., both of which are herein incorporated by reference for all purposes, and the specific purposes disclosed therein and herein.

In another embodiment, a valve may be used to control flow of liquid out of the cartridge passageway in relation to water level inside the passageway. An example of this type of valve arrangement is described in U.S. Pat. No. 6,027,639, by Lenhart, et al., and U.S. Pat. No. 5,707,527, by Knutson, et al., both of which are already incorporated by reference. The valve system of Lenhart or Knutson may be combined with the valve system of the present invention to further control the level of liquid both inside and outside of the cartridge. General operation of a filter assembly including siphon is described in pending U.S. patent Ser. No. 10/647,102, filed Aug. 21, 2003, the details of which are hereby incorporated by reference as if fully set forth herein. Various filter assembly features are also described in pending U.S. patent Ser. No. 11/746,249, titled "Stormwater Filter Assembly", the details of which are hereby incorporated by reference as if fully set forth herein.

In yet another embodiment, the valve assemblies 36 may be replaced by a valve box to which all of the conveyance conduits 32 are routed. Systems including valve boxes are described in U.S. Pat. No. 6,998,038, the details of which are hereby incorporated by reference.

Figure 18:
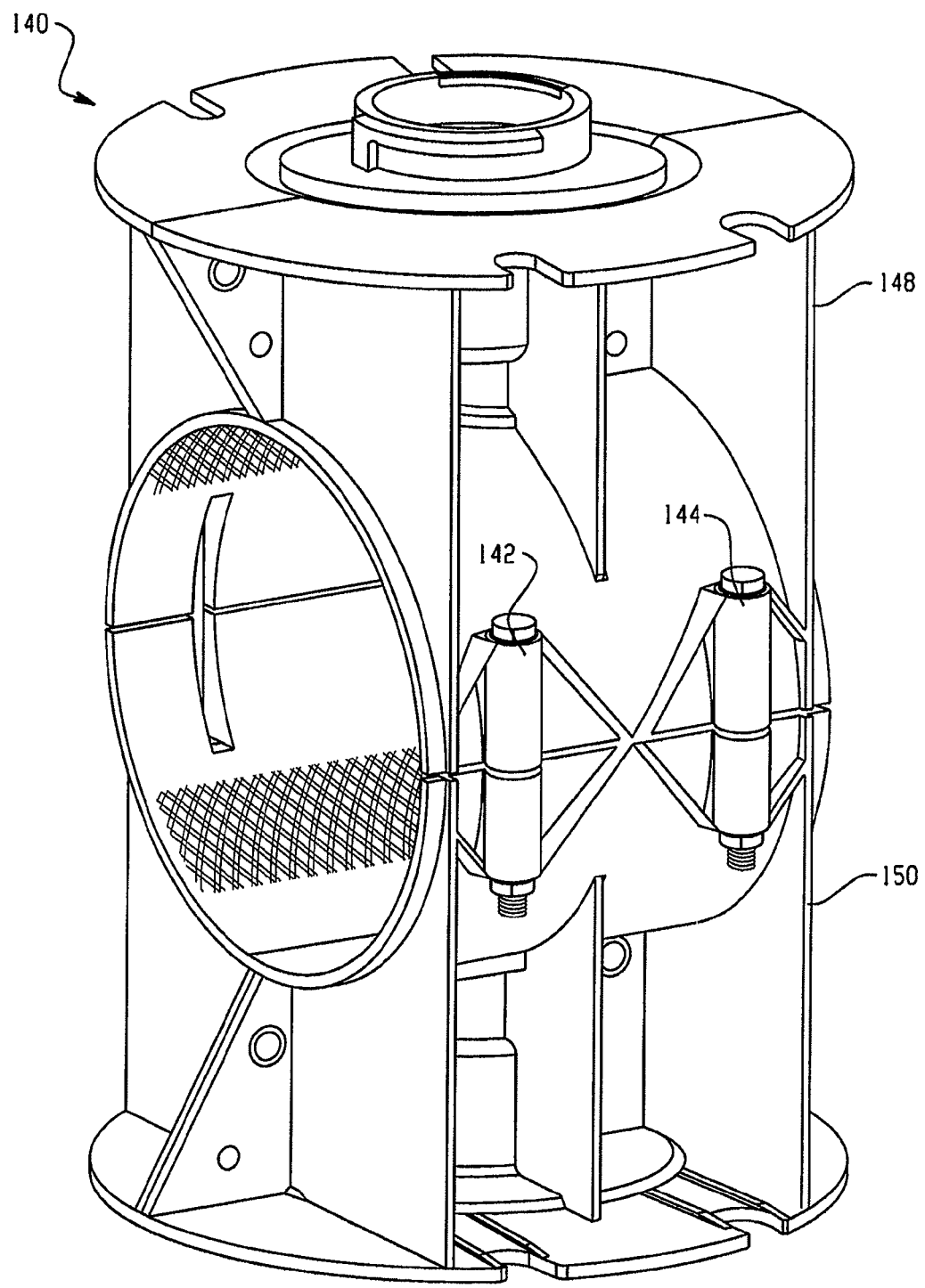
FIG. 18 is a perspective view of an alternative embodiment of a saddle for use in the treatment system of FIG. 1.
Figure 19:
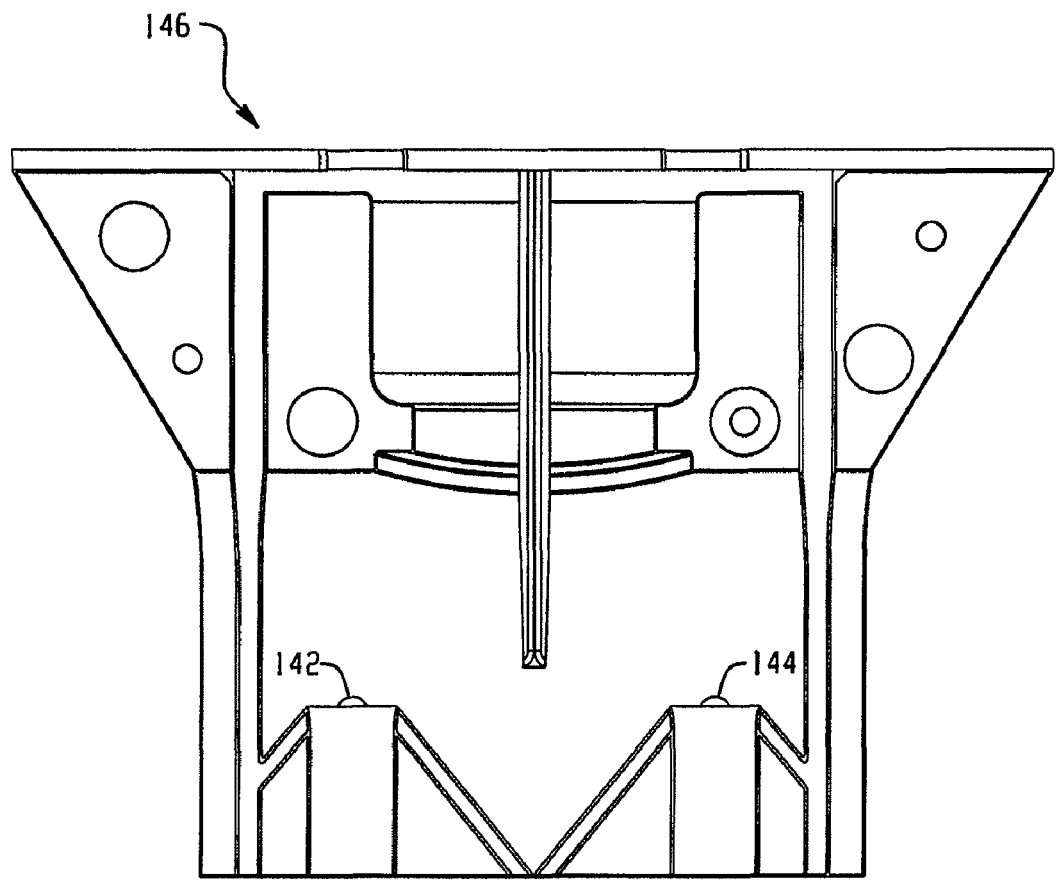
FIG. 19 shows a quarter piece of the saddle of FIG. 18.

It is to be clearly understood that the above description is intended by way of illustration and example only and is not intended to be taken by way of limitation, and that changes and modifications are possible. For example, referring to FIG. 18, a saddle 140 includes a dual clamp design with a first bolt clamp 142 and a second bolt clamp 144 on each side of the saddle. FIG. 19 illustrates a saddle quarter piece 146 of the saddle 140. As above, the first and second bolt clamps 142 and 144 allow for some vertical adjustment of the upper and lower components 148 and 150 (FIG. 18) relative to each other for accommodating the conveyance conduit 32 and forming a seal between the saddle 140 and the conveyance conduit at the port. Accordingly, other embodiments are contemplated and modifications and changes could be made without departing from the scope of this application as expressed by any claims now included or hereafter added.

What is claimed is:

1. A stormwater filtration system, comprising:
a stormwater containment structure including an inlet that receives stormwater and an outlet through which filtered stormwater exits the stormwater containment structure;
a plurality of spaced apart saddle structures positioned along the bottom of the containment structure, each saddle structure including a conduit support passage therethrough, the conduit support passages of the spaced apart saddle structures aligned with each other;
a conveyance conduit extending through the aligned conduit support passages of the plurality of saddle structures, the conveyance conduit including a plurality of sidewall ports, each sidewall port aligned with an opening of a respective saddle structure;
a plurality of filter units, each filter unit connected to a respective one of the saddle structures, such that filtered water from each filter unit flows out from a filter unit outlet, through the saddle structure opening and into the sidewall port of the conveyance conduit.

2. The system of claim 1 wherein the conveyance conduit is in fluid communication with the containment structure outlet.

3. The system of claim 1 wherein each saddle structure comprises multiple components connected together to form the conduit support passage.

4. The system of claim 3 wherein the multiple components each include a surface portion that forms part of the conduit support passage.

5. The system of claim 1 wherein the conveyance conduit is supported above the bottom surface of the containment structure.

6. The system of claim 5 wherein each filter unit is positioned above the conveyance conduit.

7. The system of claim 1 wherein a filter unit connector releasably connects each filter unit to it its respective saddle structure.

8. A stormwater filtration system, comprising:
a stormwater containment structure including an inlet that receives stormwater and an outlet through which filtered stormwater exits the stormwater containment structure;
a plurality of spaced apart saddle structures positioned along the bottom of the containment structure, each saddle structure including a conduit support, the conduit supports of the spaced apart saddle structures aligned with each other;
a conveyance conduit extending along and supported by the aligned conduit supports, the conveyance conduit including a plurality of sidewall ports, each sidewall port aligned with a respective one of the saddle structures;
a plurality of filter units, each filter unit connected to a respective one of the saddle structures, such that filtered water from each filter unit flows out from a filter unit outlet and travels into the sidewall port of the conveyance conduit;
wherein the conveyance conduit is supported above the bottom surface of the containment structure and each filter unit is positioned above the conveyance conduit.

9. A stormwater filtration system, comprising:
a stormwater containment structure including an inlet that receives stormwater and an outlet through which filtered stormwater exits the stormwater containment structure;
at least one saddle structure positioned at the bottom of the containment structure, the saddle structure including a conduit support passage therethrough;
a conveyance conduit extending through the conduit support passage and having a sidewall port aligned with an opening of the saddle structure;
a filter unit connected to a respective one of the saddle structures, such that filtered water from the filter unit flows out from a filter unit outlet, through the saddle structure opening and into the sidewall port of the conveyance conduit.

10. The system of claim 9 wherein the conveyance conduit is supported above the bottom surface of the containment structure and the filter unit is positioned above the conveyance conduit.

\* \* \* \* \*